(12) United States Patent
Vermeulen et al.

(10) Patent No.: US 6,679,378 B1
(45) Date of Patent: Jan. 20, 2004

(54) DEVICE FOR STORING AND TRANSPORTING FLAT OBJECTS

(75) Inventors: Bart Vermeulen, Wielsbeke (BE); Roland Patrick Hugenholtz, Sint-Martens-Latern (BE)

(73) Assignee: Conteyor Multibag Systems N.V., Merelbeke (BE)

(*) Notice: Subject to any disclaimer, the term of this patent is extended or adjusted under 35 U.S.C. 154(b) by 0 days.

(21) Appl. No.: 09/856,992

(22) PCT Filed: Nov. 11, 1999

(86) PCT No.: PCT/EP99/08660
§ 371 (c)(1), (2), (4) Date: Sep. 27, 2001

(87) PCT Pub. No.: WO00/35778
PCT Pub. Date: Jun. 22, 2000

(30) Foreign Application Priority Data

Dec. 14, 1998 (DE) .......................... 198 57 575

(51) Int. Cl.$^7$ .............................................. B65D 85/69
(52) U.S. Cl. .................... 206/335; 206/806; 206/583
(58) Field of Search .................. 206/335, 425, 206/806, 583, 449, 454; 312/183, 184; 211/10, 11, 45

(56) References Cited

U.S. PATENT DOCUMENTS

| | | | | |
|---|---|---|---|---|
| 533,053 A | * | 1/1895 | Cooke, Jr. ................. | 206/425 |
| 635,582 A | * | 10/1899 | Pedrick ..................... | 206/425 |
| 821,019 A | * | 5/1906 | Cooke, Jr. ................. | 229/72 |
| 1,842,077 A | * | 1/1932 | Doughty .................... | 206/425 |
| 4,232,596 A | * | 11/1980 | Kroll et al. ................ | 99/410 |
| 4,856,660 A | * | 8/1989 | Selwyn-Smith .......... | 211/46 |
| 5,725,119 A | * | 3/1998 | Bradford et al. .......... | 220/6 |
| 6,431,357 B1 | * | 8/2002 | Su ............................. | 206/425 |

FOREIGN PATENT DOCUMENTS

DE 36 19 461 12/1987

* cited by examiner

Primary Examiner—Shian Luong
(74) Attorney, Agent, or Firm—Michael L. Dunn

(57) ABSTRACT

The invention relates to a device for storing and transporting flat, substantially two-dimensional objects (10). Said device comprises a frame or the like, in which pouches (1) with substantially U-shaped cross sections are suspended and into each of which a corresponding object (10) can be inserted. The aim of the invention is to provide a device with the above-mentioned features which substantially prevents the objects accommodated in the U-shaped pouches from tilting or slipping out of said pouches. To this end, the pouches are provided with devices (5, 20) which prevent the objects (10) from tilting or being displaced in the pouches to the front or the rear without impeding the loading or unloading of the pouches (1) by restricting the free cross section of loading.

17 Claims, 3 Drawing Sheets

Figure 1:
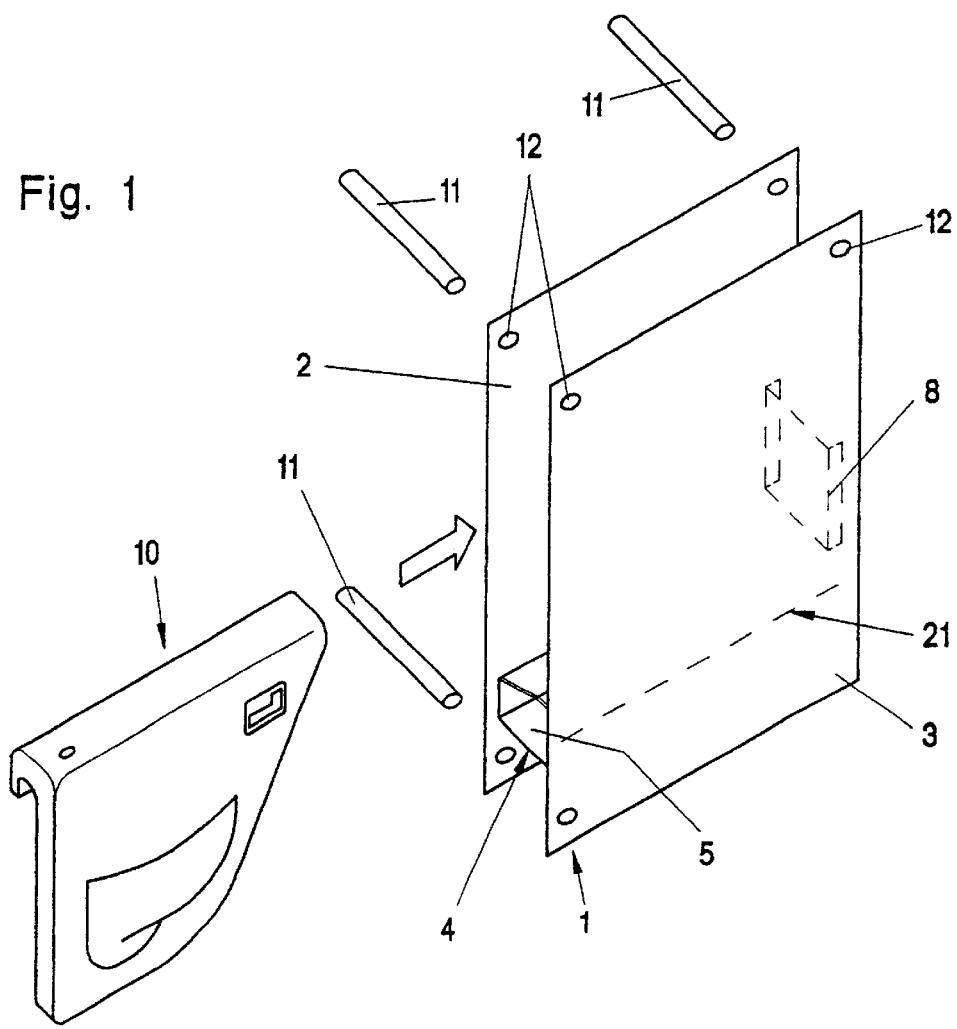

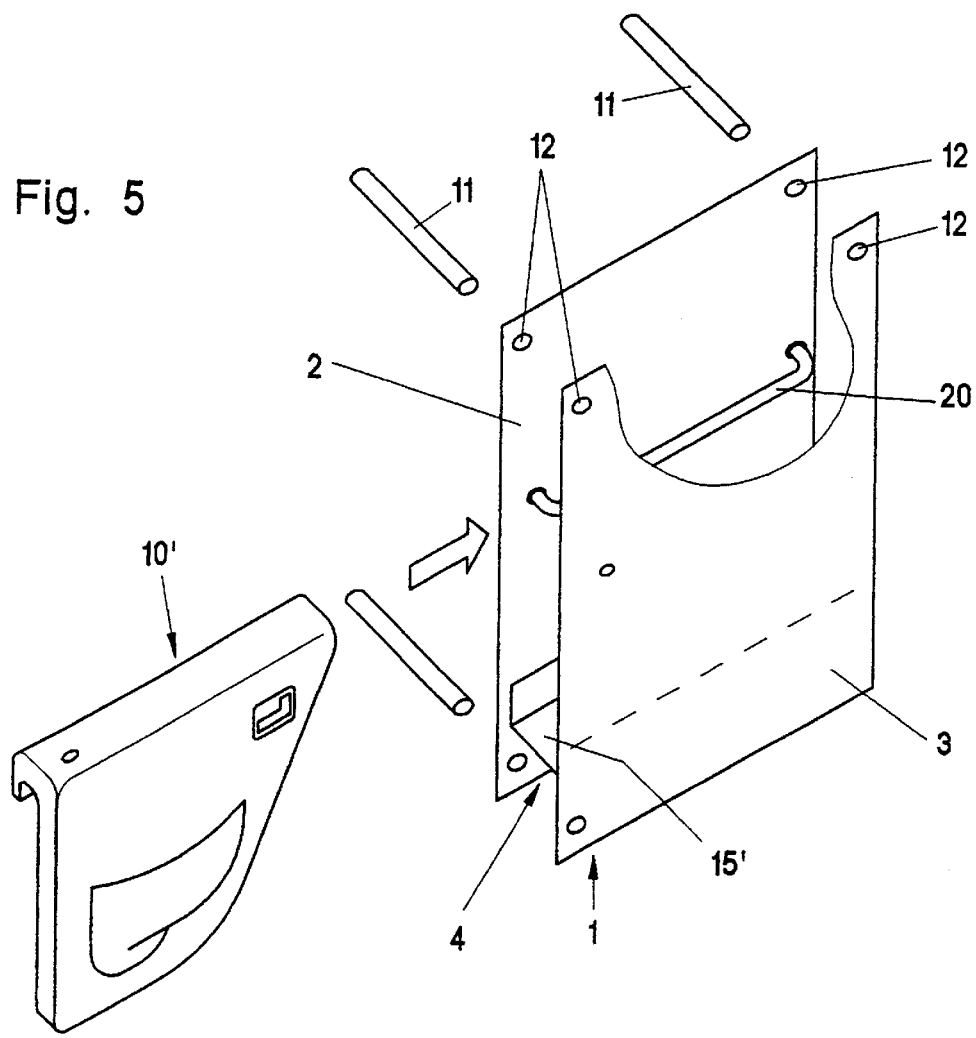
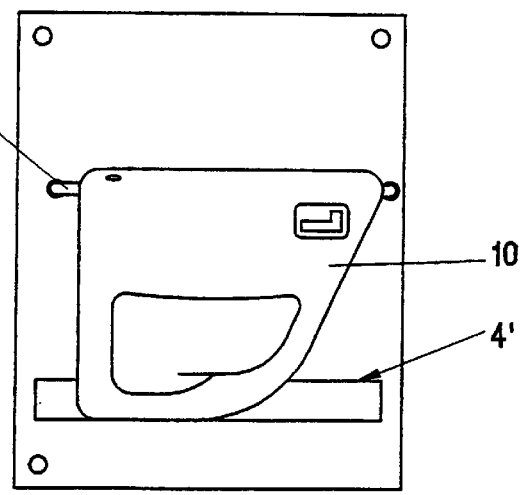

DEVICE FOR STORING AND TRANSPORTING FLAT OBJECTS

The present invention concerns an apparatus for storing and transporting flat, substantially two-dimensional articles, comprising a support stand or the like, in which are suspended pockets which are substantially U-shaped in cross-section and into each of which can be inserted a respective article.

A corresponding apparatus is known for example from German patent application No P 41 38 507.

In corresponding apparatuses which in the meantime have become relatively wide-spread, loading is effected in part from the upper open side of the U-shaped pockets, but in part also from the ends of the pockets, which for that purpose are also open. That applies in particular when the pockets are suspended in a relatively high support stand so that they can only be loaded with difficulty from above. If the pocket in question is loaded or unloaded from the side, that is to say from the open ends thereof, either the support stand in question must be laterally open or, if the sides of such a support stand are closed, the pockets must be pulled with their suspension arrangement out of the support stand to such an extent that they are accessible from their ends.

Then, flat articles such as for example door claddings of motor cars can be inserted into those pockets and later, at the location where they are required for fitting, they can be pulled out of the open ends of the pockets again, in the reverse sequence.

Corresponding apparatuses have in the meantime found relatively wide-spread use in the automobile industry. However the components to be stored and transported in the automobile industry are often highly irregular in shape and that applies for example also in regard to the above-mentioned internal door claddings for motor cars, which are generally not simply rectangular panels but which involve a more or less trapezoidal outline contour with rounded-off corners. In regard to handling and installing corresponding parts, it is desirable if they can be inserted into the pockets from the outset in the correct orientation, and do not first have to be turned into the correct position by the person who later for example installs corresponding parts in larger systems or installations. To continue with the example of motor vehicle door claddings, the short side of the trapezoidal configuration thereof is often at the bottom while the longer side of the trapezoidal configuration is at the top. The trapezium is also oblique-angled or the cladding may also be of a more or less pentagonal shape with two mutually oppositely disposed parallel sides, of which once again the lower side is the shorter side which is also not symmetrical in relation to the upper side. This means that corresponding articles in the U-shaped pockets have a tendency to tilt and in that case possibly also slip. That makes handling more difficult when removing them and can also result in damage to the articles in question if more specifically in such a situation they partially slip out of the open ends of the pockets.

From DE-U-295 01 898.4 there are known file covers for a hanging file system in which said file covers are comprising so called "linen frogs" (linen flaps) which on one side thereof are connected to the file cover in a releasable manner. Those linen flaps however, are fixed on the outside of said file covers and they serve for the purpose that, after removing such a file cover from the rack of a hanging file system, said flaps are released so that the file cover can be completely revolved in order to insert or remove paper documents. However, there is no suggestion from the document in regard of any supply from the ends of the pockets and for clearing the end face by releasing said linen flaps. Instead, even releasing of said linen flaps on one side thereof would not result in a complete clearance of the loading cross section, since such a depending linen flap would still partly extend into the area between the file cover sides. In particular, if several file covers are tightly arranged within a frame, even the linen flap from adjacent covers might cover the loading cross section of a neighbouring file, in case such loading from the front end would be provided. Moreover, said linen flaps are arranged on the outside of the file covers and fixed thereon and thus may not protect any objects against slipping or tilting if said objects are smaller than the file cover itself.

In comparison with that state of the art, the object of the present invention is to provide an apparatus having the features set forth in the opening part of this specification, by which the articles received in the U-shaped pockets can be substantially prevented from tilting and/or slipping out.

That object is attained in that the pockets are arranged in a manner that in the hanging condition thereof objects may be loaded or removed through the ends thereof and in that means are provided within said pockets which prevent tilting or slipping of the articles in the pockets forwardly or rearwardly, and which means, in order to load and discharge said pockets through the ends thereof, may be brought into a position in which they are not interfering with the free-loading cross section thereof.

The devices in accordance with the invention can be of widely varying configurations, in which respect however it is to be noted that they do not change the free loading cross-section of the pockets which is defined by the open end (and which is substantially constant throughout).

For example the device may be a preferably elastic band or strip which is tensioned along the inward side of a side wall of the pocket (1) and into which the article (10) can be hung with a part which is bent over in a hook shape.

A tensioned elastic band of that kind, if it is not required, bears snugly against the side wall of the pocket and thus does not constrict the free loading cross-section of the pockets.

In another embodiment which is not dependent on a part which is bent over in a hook shape being provided on the article and which is preferred in that respect it is provided that a transverse portion is provided at least for one of the open ends of the U-shaped pocket, which transverse portion is movable into at least one position of substantially liberating the open end and into a position of at least partially closing the open end, and is fixable in the last-mentioned position.

That embodiment of the apparatus has the advantage that, in the position in which the transverse portion completely clears the open end of the U-shaped pocket, the pocket can be loaded and unloaded in conventional manner in precisely the same way as if the transverse portion were not present at all as it precisely completely clears the open end of the U-shaped pocket. On the other hand that open end, after the article in question has been inserted, can be at least partially closed by the transverse portion, whereby the article accommodated in the pocket is effectively prevented from slipping out and/or tilting.

In that respect it is basically desirable if, in its position of at least partially closing the end of the U-shaped pocket, the transverse portion is arranged in the interior of the pocket and at a spacing from the edge of that open end.

It will be appreciated that corresponding transverse portions could be arranged at both open ends of such a U-shaped pocket, in which respect it is preferable if those transverse portions are provided only at one open end while the other end can be permanently closed or partially closed, for example by any section of a material web, which connects the two oppositely disposed limbs of the U-shape but which does not necessarily have to extend over the entire height of the pocket or the open end. This additional transverse section on the open end of the pockets, which is referred to hereinafter as the "rear", serves so-to-speak as an "abutment" for the other articles which are inserted from the other open end. It will be appreciated that this connecting portion which extends transversely on the rear of the pockets can also be provided at a spacing from the rearward open end in order for example to prevent a part of the article accommodated in the pocket from possibly nonetheless projecting out of the rear of the U-shaped pocket, when that transverse section suffers deformation.

After the article has been inserted into the pocket, the transverse portion is moved into the position in which it at least partially closes the initially open end, whereby the article accommodated in the pocket cannot slip or tilt or can do so only to such an extent until it bears against that transverse portion which partially closes the front open end. It will be appreciated that the pockets are adapted to the size of the articles to be accommodated therein and that the arrangement of the transversely extending section on the rear and of the transverse portion on the open front side is such that the article accommodated in the pocket does not have too much play between the two transversely extending parts.

A particularly preferred embodiment of the invention is one in which the transverse portion is formed at the open end from an end section of the lower U-shaped section forming the bottom of the pocket. That is desirable in particular when, when the article accommodated in the pocket slips or tilts, in particular its lower front end which is directly above the bottom of the pocket has a tendency to slip or project out of the open end of the pocket. That is then effectively prevented by precisely the lower end section of the U-shaped pocket at the same time also forming the transverse portion. That is effected for example by the lower end section of the bottom of the pocket being folded inwardly into the pocket so that the lower end section stands vertically upwardly and thus closes the lower part of the end of the U-shaped pocket.

Desirably, that end section is formed from a semi-stiff material which is preferably stiffer than the side parts of the pocket which appear in cross-section as the limbs of the U-shape.

In specific terms, this configuration can be such that for example the lower end section of the lower U-shaped part of the pocket is made from a flexible web material which is at least partially double-walled, wherein a short, semi-stiff end section panel is inserted between the two walls of that double-walled web material. That panel is either then to be folded into a horizontal position in which that end section forms the front part of the bottom of the U-shaped pocket or however it is to be moved into a vertically upwardly pivoted or upwardly folded position in which it closes the lower part of the otherwise open end of the U-shaped pocket.

Desirably the U-shaped pockets of such a structure that they comprise two side portions which in cross-section define the two limbs of the U-shape, wherein a lower part of the U-shape, which joins the two limbs of the U-shape, is in turn again of a U-shaped configuration, but with substantially shorter U-shape limbs than the pocket overall. Those shorter U-shape limbs can be sewn, glued or welded to the inside surfaces of the long U-shape limbs.

A preferred embodiment in that respect is one in which the entire bottom of the pocket is formed from a semi-stiff material, wherein the front end section of the semi-stiff material of the bottom of the U-shaped pocket can be bent over with respect to the remaining part so that this end section can be pivoted upwardly and thereby closes the lower part of the open end.

So that this position is particularly securely fixed, the preferred embodiment of the invention provides that adjoining the front semi-stiff end section of the bottom of the U-shaped pocket in lateral relationship are respective triangular flaps or tabs of a semi-stiff material which are easily movable relative to the end section of the bottom of the U-shape and which are also foldable into the interior of the pocket, in which case they bear in substantially parallel relationship against the side walls of the U-shaped pocket, which define the U-shape limbs.

Desirably, the entire lower U-shaped section can comprise a double-walled web material which has suitable darts so that the semi-stiff panel of the lower end section, like the triangular panels laterally adjoining same, can be inserted into corresponding cavities in the double-walled material.

It is also desirable if the side walls of the U-shaped pockets can be more or less tensioned. That can be achieved for example by the pockets, as viewed in a side view, being suspended or fixed at at least three of their corners, that is to say besides being suspended at their upper end, for example at the front and rear upper corner regions of the pockets, they have at least one further suspension point at a lower corner, more specifically preferably at the lower front corner.

The simplest way of achieving this is to provide that the side walls of the pockets which define the limbs of the U-shape are also prolonged somewhat beyond the lower section of the U-shape (so that the result in cross-section is essentially an H-shape with relatively short, lower limbs of the H-shape), wherein the flexible material webs of which the side parts preferably consist respectively have eyes in their front and rear upper corners and finally also an eye in the lower front corner, and wherein those side walls of the U-shaped pockets are drawn with those eyes onto suitable rods or bars of a support stand or frame so that they can be held in a substantially tensioned condition. In that way the side walls are admittedly still soft and yielding, but they cannot be urged away so easily as if the arrangement only involved pockets which hang down loosely. However, folding in the lower end section, and unfolding it again, in the embodiment having the adjoining triangular semi-stiff panels necessarily requires the two side surfaces of the U-shape to be laterally urged away from each other so that, if those side surfaces are tensioned between corresponding rods or bars, the side surfaces oppose a certain resistance to being urged away from each other in that way, whereby the lower, upwardly pivotable end section of the bottom of the U-shaped pockets is more or less fixed in its upwardly pivoted position. That applies in particular when a plurality of pockets of that kind are arranged in immediately side-by-side relationship and in a condition of contact with the adjacent pockets in a relatively large frame or support stand so that there remains only very little play for the individual side walls of the pockets, for relative movements with respect to the oppositely disposed wall.

On the other hand, as the pockets overall consist of a flexible web material, that play is nonetheless sufficient for selectively opening or closing the ends of the individual pockets at their lower ends.

Figure 2:
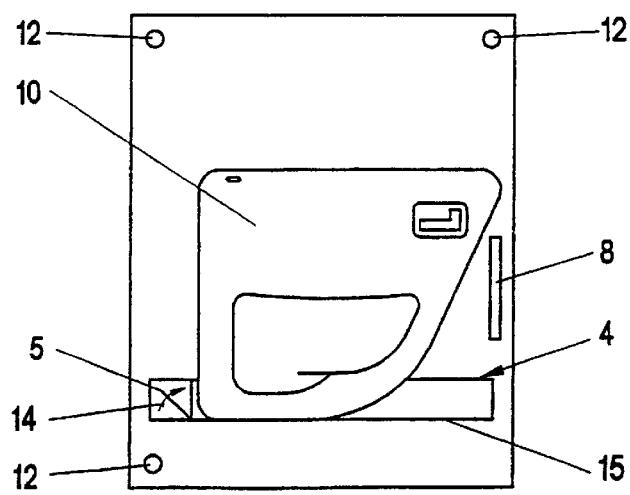
Figure 3:
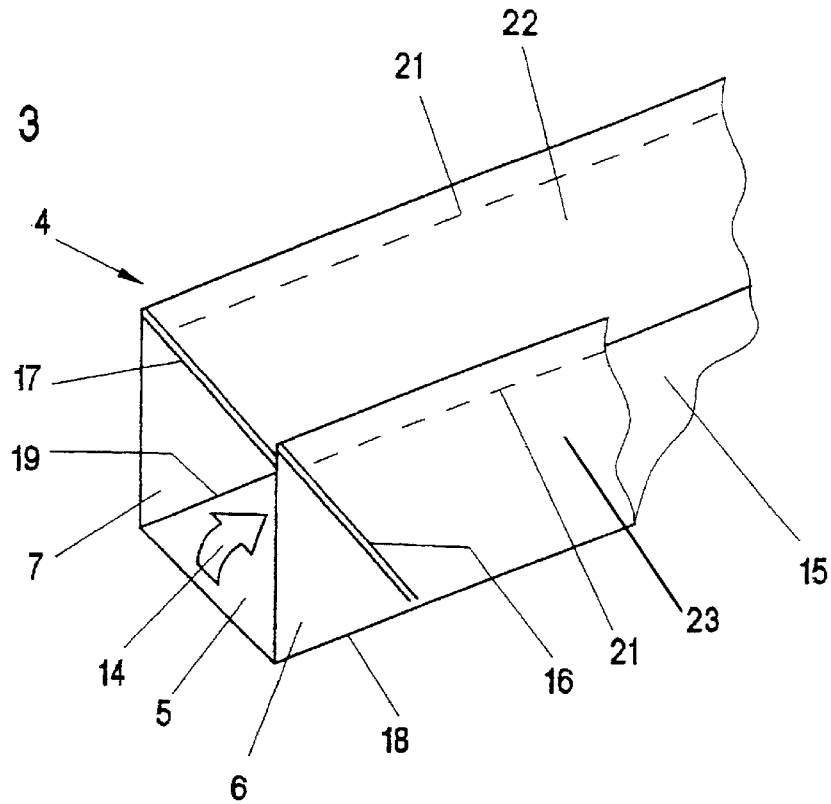
Figure 4:
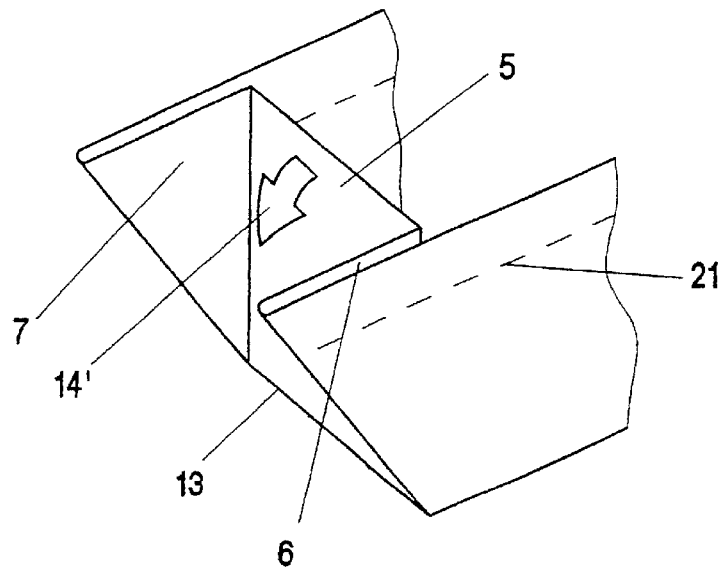

Further advantages, features and possible uses of the present invention will be clearly apparent from the following description of a preferred embodiment and the accompanying drawings in which:

FIG. 1 is a perspective view of an embodiment of a pocket according to the invention with an article arranged in front of the open end of the pocket, FIG. 2 is a side view of the pocket with the article arranged therein, with the one side wall of the pocket being shown as transparent, FIG. 3 is a detail view of the lower section of the U-shape of the pocket illustrated in FIG. 1, FIG. 4 shows the same detail but with an upwardly pivoted end section which closes the end of the pocket in the lower region, FIG. 5 shows a further embodiment of a pocket according to the invention with an element for hanging an article therein, and FIG. 6 is a side view of the pocket of FIG. 5 with the article accommodated therein and with a side wall which is omitted or illustrated as being transparent.

As can be seen from FIG. 1 the pocket 1 essentially comprises two parallel flat side portions 2, 3 which are made from a flexible web material and which are connected together in their lower region by a lower U-shaped section 4. In the end view (from the view of the article 10 to be inserted into the pocket) that results in essentially a U-shaped configuration at least for the upper part of this pocket, in which respect it will be noted however that the limbs of the U-shape, which comprise the two side walls 2, 3, are also extended downwardly beyond the lower transverse web portion of the U-shape so that ultimately, in cross-section, the result is an H-shaped configuration, with however very short lower limbs of the H-shape, which also serve for fixing the side walls 2, 3. The actual space for accommodating the articles 10 is only defined by the larger, U-shaped region of the pockets.

As can be seen from FIG. 1, the front end of this U-shaped pocket is open for receiving the article 10 to be inserted therein. The rearward end of the U-shaped pocket 1 is closed by a connecting section 8 which connects together the two oppositely disposed side walls 2 and 3, at a spacing from the rear open end.

In their upper corner regions, the side walls 2, 3 have respective holes or eyes 12 and likewise also in their lower front corner region. In use the side walls 2, 3 are drawn with those eyes 12 onto the bars or tubes 11 (of which only short sections are indicated here) and which are parts of a frame or support stand in which a plurality of such pockets are accommodated in side-by-side relationship and which completes the apparatus. The core of the invention however is formed by the pockets as the other parts of the apparatus have already been disclosed in other patent applications to the present applicants.

If necessary the fourth corner region of the side walls 2, 3 (bottom rear) could also have a corresponding eye 12 through which a rod or bar 11 could be passed in order to tension the side walls 2, 3 to afford a substantially flat level shape in the support stand or frame. In the present case however it is desirable above all that the pockets are suspended on the one hand at the upper eyes but on the other hand the pockets are also tensioned more or less tautly along the front edge which defines the edge of the U-shaped receiving opening for the article 10, or at least cannot be deformed and urged away from each other to just any width.

Reference is made to FIG. 2 showing the way in which the article 10 which is illustrated specifically as a door cladding for the door of a private motor vehicle is accommodated in a corresponding pocket. The article is inserted from the left into the open end of the pocket until it bears with its rear edge against the transversely extending connecting section 8. The lower edge of the article 10 rests on the bottom 15 of the U-shaped pocket 1 which for example can be formed from a semi-stiff material.

The term "semi-stiff" is used in accordance with the present invention to denote a material property which makes articles produced therefrom substantially stable in respect of shape and self-supporting but which nonetheless makes it possible for the material for example also to be deformed by hand by the application of suitably slight forces. An example of semi-stiff material in this sense would be for example cardboard material or however plates or panels of relatively thin plastic material such as PVC or the like.

As can be seen from FIG. 2, the two side walls 2, 3 are connected together in their lower region not only by a transversely extending portion of the U-shape but the part which connects the two side walls 2, 3 is in turn of an U-shaped configuration and can be made for example from a substantially flexible web material which is also identical to the material of the side walls 2, 3, in which respect however the limbs of the U-shaped section 4 are substantially shorter than the side walls 2, 3 which extend in that direction. The upper ends of the U-shape limbs of the U-shaped section 4 are sewn to the side walls 2, 3 along the seam lines 21 which are indicated in broken line, but they could equally well be glued or welded in position, depending on the materials from which the side walls 2, 3 and the U-shaped section 4 are made.

As already mentioned, the lower, transversely extending web portion 5 of the U-shape comprises for example a semi-stiff material or a plate-shaped or strip-shaped element which is inserted into a suitable pocket in a double-walled web material, from which the U-shaped section 4 can be produced. The front end section 5 of that bottom 15 of the U-shaped pocket 1 or the U-shaped section 4 is however not integrally or not rigidly connected to the remaining part of the bottom 15 but is movable so that it can be pivoted upwardly into a vertical position as indicated by the arrow 14 shown in FIG. 2.

The U-shaped section 4 is illustrated in detail in FIGS. 3 and 4. The U-shaped section 4 comprises the lateral limbs 22, 23 and the lower transverse portion 15. In particular the lateral limbs 22, 23 are made from a flexible web material while, as already mentioned, the lower transverse portion 15 comprises a semi-stiff material. The end section 5 of that transverse portion 15 is flexibly connected to the remaining part of the transverse portion 15 and is pivotable upwardly. That end section 5 however in turn also comprises a semi-stiff material or has such a semi-stiff material which for example is inserted in the form of a plate or panel into a pocket in the U-shaped section 4 which in other respects is made from a flexible web material. Two triangular end sections 6, 7, which are also semi-stiff, of the limbs 22 and 23 of U-shape are connected to that semi-stiff lower end section 5. These semi-stiff end sections 6, 7 are flexibly connected along the bend lines 16, 17 to the lateral limbs 22, 23 and along the bend lines 18, 19 to the lower end section 5. The end section 5 is also connected by way of a flexible bend location 13 to the bottom 15 of the U-shaped pocket 1. These bend locations or bend lines make it possible for the lower end section 5 to be pivoted upwardly as indicated by the arrow 14 into the vertical position shown in FIG. 4. As the elements 5, 6, 7 are admittedly flexibly connected to each other but in turn are semi-stiff, that upward pivotal movement is only possible by virtue of the fact that the two lateral limbs 22, 23 of the U-shaped section 4 and therewith also the side walls 2, 3 of the entire U-shaped pocket 1 are urged away from each other and deformed in the region of the bend lines 16, 17.

That is conversely also required if the end section 5 is to be pivoted along the arrow 14' again back into the position shown in FIG. 3. If however the fact that a plurality of pockets 1 are compactly arranged in a frame or support stand and possibly the fact that those pockets are even pressed together means that deformation of the side walls 2, 3 and the limbs 22, 23 of the U-shape is not readily possible, the end section 5 also cannot be readily pivoted back downwardly out of its position shown in FIG. 4, in particular not by the article 10 bearing against that end section 5 for example due to vibration when being transported. As can be clearly seen in connection with FIG. 2, the upwardly pivoted end section 5 secures the article 10 to prevent it from tilting and slipping away in the U-shaped pocket 1.

Particularly in the event of transportation therefore it is desirable for the corresponding pockets to be fixed in a frame, support stand, housing or the like in such a way that the side walls 2, 3 are not readily movable relative to each other. For example a plurality of corresponding pockets 1 can be threaded with their eyes 12 onto the rods or bars 11 and those pockets can be pressed as compactly as possible against each other and fixed in suitable positions on the bars or tubes 11. For loading and unloading purposes those pockets can then be released insofar as it is not otherwise possible for the end section 5 to be pivoted downwardly. However, engaging therein by hand and tilting and tipping the individual plate elements 5, 6, 7 also enables a skilled person, if the pockets are suitably pressed together, to pivot the end section 5 downwardly. In the downwardly pivoted position of the end section, which can be seen from FIGS. 1 and 3, the end of the pockets 1, which is intended for the loading and unloading operation, is completely free from any obstacles so that the individual articles 10 can be loaded and unloaded without any problem.

An alternative to the embodiment just set forth hereinbefore is illustrated in FIGS. 5 and 6. In contrast to the embodiment shown in FIGS. 1 to 4 the pocket 1' shown in FIG. 5 does not have an upwardly pivotable, lower, front end section of the bottom of the pocket but instead it has a band 20 which is mounted along a side wall 2' on the inward side of the pocket, for example a rubber bandor the like. The article 10' which once again here is illustrated in the form of a door cladding is bent over in a U-shape along its upper edge, as can be seen from FIG. 5.

When or after the article is inserted into the open end of the pocket 1', the article 10 is suspended into the rubber band 20 with its upper edge which is bent over in a U-shape and in that way is also secured to prevent it from tilting or slipping.

The condition of being suspended on the rubber band is shown once again as a side view in FIG. 6.

What is claim is:

1. An apparatus for storing and transporting flat, substantially two-dimensional objects (10), comprising a support stand, in which are suspended pockets (1) which pockets are substantially U-shaped in cross section, wherein the pockets are suspended so that objects (10) may be loaded or removed through at least one end of each of said pockets and wherein at least one means (5, 20) is provided for a pocket which prevents tilting or slipping of objects (10) in the pocket forwardly or rearwardly when said means (5,20) is in a closed position, and which means (5, 20), in order to load and discharge said objects into and out of said pocket through said at least one end thereof, may be brought into an open position in which it is not interfering with a free-loading end cross section thereof when said means remains secured to the pocket.

2. An apparatus according to claim 1 wherein there is provided at least at a first of the ends of the U-shaped pockets, a transverse portion (4) at least an end section of which is movable into at least one position of substantially clearing the first end so that said end is open and into another position of at least partially closing the open end, and is fixable in said last-mentioned position.

3. An apparatus according to claim 2 wherein in its condition of at least partially closing the first end, the transverse portion (5) is arranged in the interior of the U-shaped pocket.

4. An apparatus according to claim 3 wherein the lower U-shape section of the U-shaped pockets comprises an at least partially double-walled flexible web material, wherein inserted between the two walls of the double-walled web material is at least one short-semi-stiff end section panel forming an end section of the U-shape section.

5. An apparatus according to claim 4 wherein a lower U-shape section of the pockets is formed from a web material which is substantially U-shaped in cross section and the limbs of the lower U-shape of which are substantially shorter than limbs of the U-shape formed by the side walls 2,3 of the U-shaped pockets overall and which limbs of the lower U-shape section are secured to said sidewalls 2,3.

6. An apparatus according to claim 5 wherein the short limbs of the U-shape of the lower U-shape section comprise a semi-stiff lateral end sections of substantially triangular shape, arranged beside the semi-stiff panel which is arranged in the lower transverse portion of the U-shape.

7. An apparatus according to claim 2 wherein the transverse portion (5) is formed from an end section of the lower U-shaped section forming the bottom of the pocket.

8. An apparatus according to claim 7 wherein the end section is formed from a semi-stiff material.

9. An apparatus according to claim 7 wherein the lower U-shaped section has substantially over its entire length an at least semi-stiff panel with an end section (5) which can be bent over.

10. An apparatus according to claim 7 wherein the end section is formed from a semi-stiff material which is stiffer than the side portions (2,3) of the U-shaped pockets (1).

11. An apparatus according to claim 2 wherein a lower U-shape section of the pockets is formed from a web material which is substantially U-shaped in cross section and the limbs of the lower U-shape of which are substantially shorter than limbs of the U-shape formed by the side walls 2,3 of the U-shaped pockets overall and which limbs of the lower U-shape section are secured to said sidewalls 2,3.

12. An apparatus according to claim 2 wherein lateral sidewall portions (2, 3) of the U-shaped pockets (1) are prolonged below the transverse portion of the lower U-shape section (4) so that essentially an H-shape is formed in cross-section, with relatively short lower limbs of the H being below the transverse portion.

13. An apparatus according to claim 2 wherein in side view the U-shaped pockets are suspended at at least three of their corners.

14. An apparatus according to claim 13 wherein the U-shaped pockets, besides being suspended at their upper end, are suspended at least also in the region of the lower end of an open end of the pocket.

15. An apparatus according to claim 1 wherein in side view the U-shaped pockets are suspended at at least three of their corners.

16. An apparatus according to claim 15 wherein the U-shaped pockets, besides being suspended at their upper end, are suspended at least also in the region of the lower end of an open end of the pocket.

17. An apparatus according to claim 1 wherein the means for preventing tilting or slipping is device comprising an elastic band which is tensioned along the inward side of a side wall of the pocket (1) and into which a part of the object (10) can be engaged.

* * * * *